United States Patent [19]

DeLuca

[11] Patent Number: 4,996,526
[45] Date of Patent: Feb. 26, 1991

[54] POWER CONSERVATION METHOD AND APPARATUS FOR A PORTION OF A SYNCHRONOUS INFORMATION SIGNAL

[75] Inventor: Michael J. DeLuca, Boca Raton, Fla.

[73] Assignee: Motorola, Inc., Schaumburg, Ill.

[21] Appl. No.: 278,520

[22] Filed: Dec. 1, 1988

[51] Int. Cl.[5] ............................................. G08B 5/22
[52] U.S. Cl. ........................ 340/825.44; 340/825.48; 455/343
[58] Field of Search ............... 340/825.44, 825.48, 340/825.2, 825.21, 311.1; 455/343, 228

[56] References Cited

U.S. PATENT DOCUMENTS

| | | |
|---|---|---|
| 3,769,593 | 10/1973 | Williams . |
| 3,783,384 | 1/1974 | Wycoff . |
| 4,370,753 | 1/1983 | Ehmke . |
| 4,385,398 | 5/1983 | Wycoff et al. . |
| 4,417,246 | 11/1983 | Agnor et al. ................... 340/825.44 |
| 4,419,765 | 12/1983 | Wycoff et al. . |
| 4,518,961 | 5/1985 | Davis et al. .................... 340/825.44 |
| 4,649,538 | 3/1987 | DeLuca et al. ...................... 371/25 |
| 4,663,623 | 5/1987 | Lax et al. ........................ 340/825.44 |
| 4,755,816 | 7/1988 | DeLuca ........................... 340/825.44 |
| 4,849,750 | 7/1989 | Andros et al. .................. 340/825.44 |

Primary Examiner—Donald J. Yusko
Assistant Examiner—Edwin C. Holloway, III
Attorney, Agent, or Firm—Daniel R. Collopy; Vincent B. Ingrassia; William E. Koch

[57] ABSTRACT

A receiver receives a transmitted digital signal having a synchronization signal and information signals. The receiver synchronizes to the synchronization signal and detects predetermined signals within the information signals. When it is determined that an information signal is substantially different from the predetermined signals, power is conserved for the remainder of the information signal.

16 Claims, 11 Drawing Sheets

POWER CONSERVATION METHOD AND APPARATUS FOR A PORTION OF A SYNCHRONOUS INFORMATION SIGNAL

BACKGROUND OF THE INVENTION

1. Field of the Invention

This invention relates generally to the area of conservation of power in a receiver synchronously detecting at least one predetermined signal within an information signal, and more particularly to a method and apparatus for conserving power for a portion of the reception of the information signal while attempting to detect the at least one predetermined signal.

2. Description of the Prior Art

Figure 1:
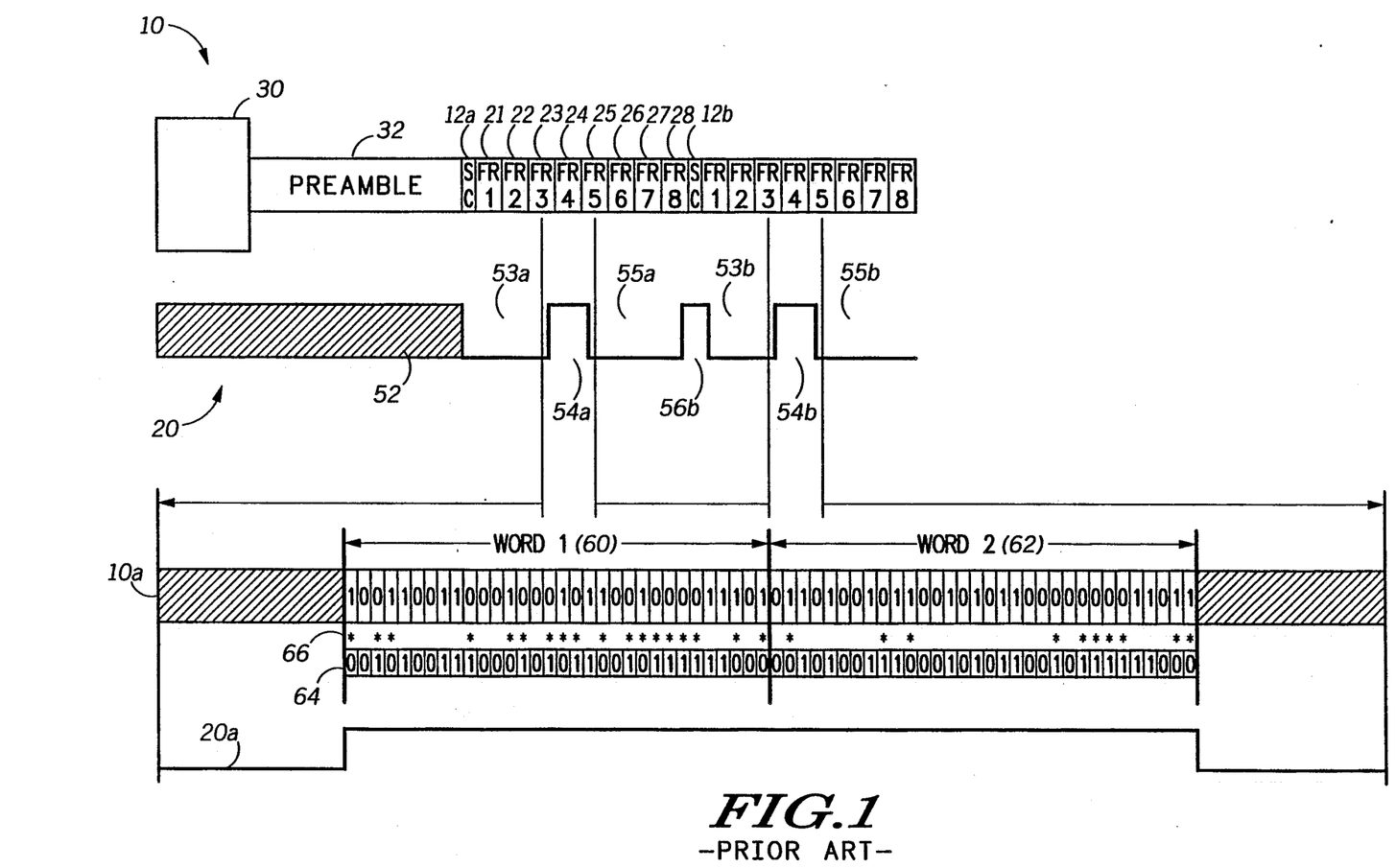
FIG. 1 shows a prior art POCSAG protocol signal and a power conservation strobe used in prior art receivers.

Synchronous detection of information signals is provided for in a digital signaling protocol proposed by British Telecom in England which is commonly termed POCSAG (Post Office Code Standardization Advisory Group). FIG. 1 shows a typical POCSAG protocol signal 10, and a power conservation strobe 20, used in prior art receivers. The synchronization signal corresponds to the sync code 12a and 12b. The sync code is a predefined 32 symbol word occurring at the beginning of a batch. The POCSAG protocol is transmitted on a radio frequency carrier and is modulated using binary FSK, consequently one symbol corresponds to one binary bit in the POCSAG protocol. Each batch has a sync code 12 and eight frames of information 21-28. Each frame has two information words corresponding to information signals. An information word is a 32 bit binary word having 21 information bits and 11 parity bits. The information word is structured as a 31,21 extended BCH word having one extra parity bit, henceforth referred to as a 32,21 BCH word.

Area 30 of FIG. 1 represents a time when no signal is transmitted. The POCSAG signal begins with a preamble 32. The first batch begins with a first sync code 12a. During the time spanning intervals 30, 32 and 12a, the receiver performs a sync acquisition process as indicated by area 52 of line 20 using processes well known in the art. After acquiring sync, the receiver begins a batch decoding process wherein the receiver decodes information within a preassigned frame. The information words within the frame may include an address matching a predetermined address assigned to the receiver, in response to which the receiver would alert. The information words within the frame may include addresses for other pagers, or message data associated with an address, or idle code words.

Assume the receiver operating per FIG. 1 has been preassigned to frame 4. Having acquired sync at the end of interval 52, the receiver conserves power during interval 53a. The receiver operates in a high power mode during interval 54a in order to decode information within frame 4. During interval 55a, the receiver operates in a low power mode until interval 56b wherein the receiver operates in a high power mode in order to receive the second sync code 12b. The power conservation cycle repeats for intervals 53b, 54b and 55b.

Events during intervals 54a and 54b are shown in greater detail. A representative frame from line 10 shown as line 10a has two 32 bit information words, WORD 1, 60, and WORD 2, 62. The contents of the first information word, 60 is 1 0011 0011 0001 0001 0110 0100 0011 101. The leading bit being a "1" indicates the information word is a data word. The contents of the second information word, 62, is 0 1101 0010 1100 1010 1100 0000 0011 011. The leading bit being a "0" indicates the information word is an address word. Line 64 shows an example of a predetermined address of the receiver. The address is 0 0101 0011 1000 1010 1100 1011 1111 000.

In this example the receiver has a single address. The address of the receiver is shown under WORD 1, 60, and repeated under WORD 2, 62, so that a visual comparison may be made between the information words and the receiver address. Note that neither information word substantially matches the receiver address. Between each information word and the receiver address is a line of "*" symbols, 66, representing bits where the content of the information word differs from the content of the receiver address. Note that in the first word, differences occur in bit locations 1, 3, 4, 10, 13, 14, 16-18, 20, 22-27, 30 and 32. In the second word, bit differences occur in bit locations 2, 9, 1, 22, 24-27, 31 and 32. Line 20a shows in greater detail the operation of the power strobe during the two information words. Note that the power strobe is active for the entire portion of each information word. The 32,21 code allows for two bits of correction while searching for an address, it follows that if a bit difference of three or grater is found, the address will not be detected. In the information words of FIG. 1, the three bit difference is found after the 4th bit of the WORD 1 and after the 11th bit of the WORD 2. However, prior art receivers remain active for the entire 32 bit information word.

With the growing success of digital paging systems, and the ever decreasing size of paging receivers and batteries, and consequently battery capacity, it is desirable to conserve power whenever possible. Advances in receiver technology have provided means for rapidly switching receivers ON which makes additional power conservation techniques a possibility. Additional power conservation may be realized by conserving power during a portion of an information word.

SUMMARY OF THE INVENTION

It is an object of the invention to detect a first portion of a synchronous information signal and conserve power for a second portion if the first portion is substantially unequal to a first portion of a predetermined signal.

It is another object of the invention to inhibit the power conservation for the second portion in order to detect the second portion if the first portion is substantially equal to the first portion of the predetermined signal.

It is yet another object of the invention to provide a reduced power receiver consuming power while receiving a transmitted signal having a synchronization signal for providing a timing reference for reception of a plurality of information signals, each information signal dividable into a plurality of portions. The receiver comprises a synchronization means responsive to the transmitted signal for detecting the synchronization signal and for generating a timing signal indicative of the occurrence of the information signal. The receiver also comprises a first detecting means responsive to the transmitted signal and the timing signal for detecting a first portion of the information signal and for generating a first undetect signal in response to the first portion being substantially unequal to a corresponding first portion of a predetermined signal. And the receiver comprises a power conservation means responsive to the first undetect signal for reducing the power consumption of the receiver for a subsequent portion of the information signal.

DESCRIPTION OF A PREFERRED EMBODIMENT

Figure 2:
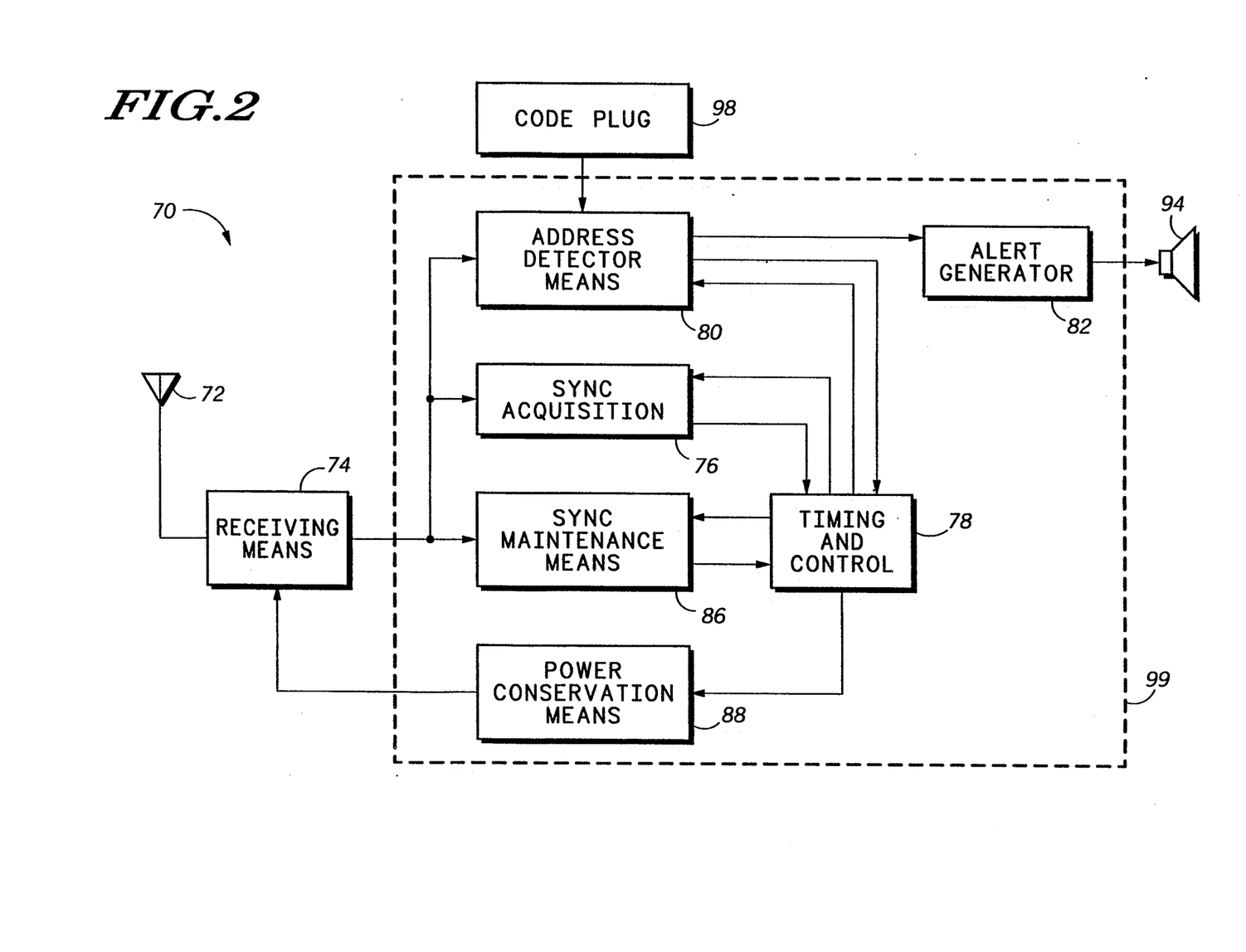
FIG. 2 shows a block diagram of a preferred embodiment of the receiver of the present invention.

FIG. 2 shows a block diagram of a preferred embodiment of the present invention. A POCSAG modulated signal enters paging receiver 70 through antenna 72 and is received and demodulated by receiving means 74. Synchronization to the demodulated signal is acquired by sync acquisition means 76. Then, under control of timing and control means 78, address detecting means 80 is enabled at an appropriate time. The address detector detects the presence of at least one address matching an address preassigned to the receiver. Preassigned addresses are stored in code plug 98. If the address of the receiver is found, alert generator 82 is activated and an audio signal is produced by transducer 94. Additionally, in response to the timing and control means the sync maintenance means 86 is activated in coincidence with the expected occurrence of the sync code in order to provide sync maintenance in a known manner.

The address detecting means 80 receives timing signals indicative of bit sampling times and information word boundaries from the timing and control means 78. This enables the address detector to synchronously begin detecting at the first bit of each information word within a frame assigned to the pager. The address detector receives a number of bits comprising a first portion of the information word and determines if the information word is substantially unequal to each address. If all such addresses are substantially undetected, address detecting means 80, signals timing and control means 78, to cause power conservation means 88 to conserve power for the duration of the information word. Power conservation means 88 may also be directed by the timing and control means to conserve power during intervals between sync codes and receiver frames in a known manner. The number of bits within a first portion depends upon the embodiment of the invention. Embodiments will be shown where the first portion may be predetermined or variable, and embodiments using a first and a second portion will also be shown.

Function blocks of 76 through 88 may be implemented in hardware circuits. However, the preferred embodiment implements these function blocks in a program having software routines which operate within host microcomputer 99 as indicated by hatched lines. A host microcomputer, such as the Motorola MC146805H2 microcomputer, may readily implement the functions of blocks 76 through 88 and is a preferred host microcomputer. Descriptions are well known in the art that enable one skilled in the art to, with a microcomputer within a receiver, control the receiver, decode transmitted signals and make the invention as described herein. Such descriptions include U.S. Pat. No. 4,518,961, May 21, 1985, to Davis et al, U.S. Pat. No. 4,649,583, Mar. 10, 1987 to DeLuca et al, and U.S. Pat. No. 4,755,816, July 5, 1988, to DeLuca which are hereby incorporated by reference.

Figure 3:
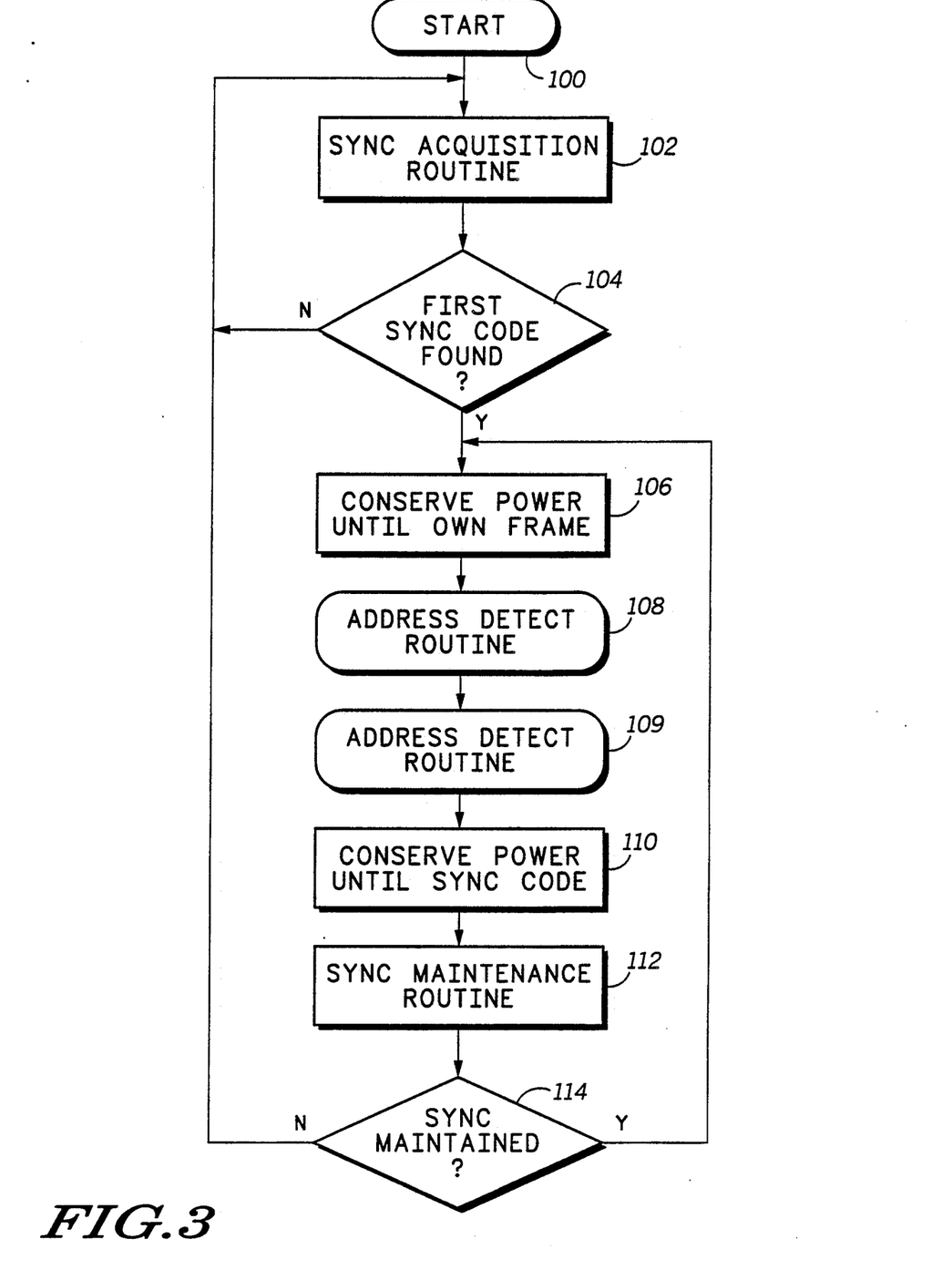
FIG. 3 shows a flow chart of the overall operation of the present invention and providing for several embodiments of the present invention.

FIG. 3 shows a flow chart of the overall operation of a preferred embodiment of the present invention. Microcomputer 99 (FIG. 2) executes a program, the output of which implements the present invention. Note that the functions implemented by the microcomputer 99 for the operation of the receiver are numerous and well known in the art. Only those functions necessary for description of the invention will be detailed herein.

The program starts at step 100 which is typically a power on sequence. The program proceeds to the sync acquisition routine 102 which searches for and synchronizes to the POCSAG signal. Finding the first sync code in step 104 indicates synchronization to the POCSAG signal. Steps 102 and 104 are performed until synchronization to the POCSAG signal is achieved.

Upon synchronization, the programing proceeds to step 106 where power is conserved until the receiver's own frame. The power conservation includes operating either the receiving means 74 or the microcomputer 99, or other receiver circuitry in a low power mode and are performed by power conservation means 88 (FIG. 2).

Next, in step 108, the receiver is operated in a high power mode for at least a portion of the first information word within the frame in order to detect at least one of the receiver's addresses within the first information word. If an address of the receiver is found, an alert may be generated.

Next, in step 109, the receiver is operated in a high power mode for at least a portion of the second information word within the frame in order to detect at least one of the receiver's addresses within the second information word. If the address of the receiver is found, an alert may be generated.

Next in step 110, power is conserved until the next sync code. In step 112 a sync maintenance routine is performed. Sync maintenance is a process well known in the art. During the sync maintenance routine, the receiver is operated in a high power mode in order to detect a sync code. One result of the sync maintenance routine is to determine either if synchronization is maintained or if the transmission signal is ended.

After completion of step 112, the program then proceeds to step 114 to determine the result of the sync maintenance routine. If the determination is made that sync is maintained, the program returns to step 106 thereby continuing the decoding of the POCSAG signal. If, however, the determination is made that sync is not maintained, the program returns to step 102 to reacquire sync.

Thus, the overall flow of the sync acquisition, address detection and sync maintenance have been shown. It has been stated that power conservation may be performed during a portion of the address detecting routine. FIGS. 4, 5, 6 and 7 detail four embodiments of the present invention that conserve power while address detecting.

Figure 4:
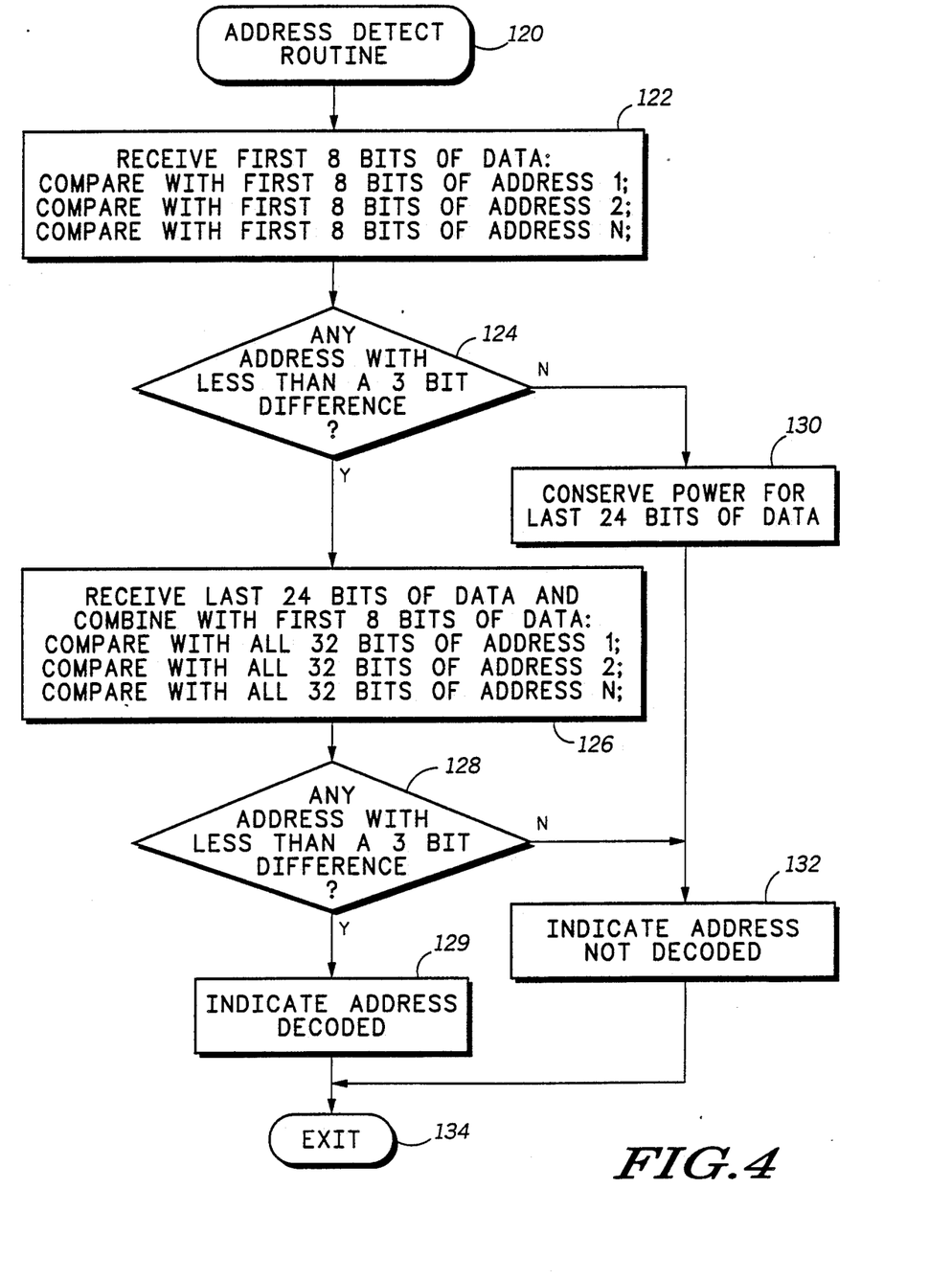
FIG. 4 shows a flow chart of a first embodiment of the address detect routine of the present invention.

FIG. 4 shows a first preferred embodiment of the invention. The flow chart of FIG. 4 details the operation of the receiver which conserves power while address detecting. The routine enters at step 120 which is equivalent to either step 108 or 109 of FIG. 3. The pager already synchronized to the signal by the sync code, receives the first 8 bits of the information word in step 122. These bits are compared to the first eight bits of each address within the code plug 98 (FIG. 2) to be detected in the POCSAG frame being received. The number of addresses is variable in a pager and is usually dependent on the messaging functions desired by the pager user. A pager may be assigned from one to sixteen addresses in a frame. If a pager has a single address, the first eight received bits are compared with the first eight bits of the single address, while if the pager has sixteen addresses detectable in the frame, the first eight received bits are compared with the first eight bits of each of the sixteen addresses.

After the comparison is made, the program proceeds to step 124 to check if the maximum number of differences for each address is not exceeded. If less than 3 bits are different in any of the addresses, the maximum number of differences is not exceeded and the program proceeds to step 126 to receive the last 24 bits of the information word. The last 24 bits are combined with the first 8 bits to form a 32 bit information word. The combined 32 bit information word is compared with each of the 32 bit addresses receivable in the frame. After the comparison is made, the program proceeds to step 128 to check if the maximum numbers of differences for each address is not exceeded. If less than 3 bits are different in any of the address, the maximum number of differences is not ,exceeded and an address is decoded. The program proceeds to step 129 to indicate the address is decoded. The indication may be used by several other routines in the microcomputer to continue receiving a message following the address, or to begin an alert process, both of which processes are known in the art and are not necessary for the description of the invention.

It should be noted that the 32,21 parity technique used for determining the addresses prohibits the decoding of more than one address at a time. The parity generating algorithm forces at least five bits to be different from each valid address. Consequently in order for the requirement of step 129 for less than a three bit difference between the received information word and an address word to be true, only one address can be detected. Differences are provided for in the reception of an address in order to correct for transmission errors which may result from a weak transmitted signal or another RF signal interfering with the transmitted signal. Such situations can cause bits within the information word to be received inverted. The requirement of less than three bits difference allows up to two bits in the received information word to be received inverted while still providing for the detection of the address.

Referring back to step 124, if the maximum numbers of differences are exceeded for each address, the program proceeds to step 130 to conserve power for the remaining 24 bits of the information word. Conserving power may include disabling the receiver section of the pager and/or reducing the power consumption of the microcomputer and/or other support circuits. Power conservation may be reliably performed since at step 124, the number of acceptable differences for every 32 bit address is exceeded in the first 8 bits. After conserving power, the program proceeds to step 132 to indicate to other routines operating within the microcomputer that no address was decoded. Step 132 is also reached from step 128 if none of the addresses have less than a three bit difference from the received information word. From either step 128 or 132, the routine returns to the calling program of FIG. 3 through the exit, 134.

FIG. 4 shows a receiver synchronized to a paging signal and performing an address detect routine in order to receive and detect predetermined addresses with an information word. The address detector synchronously receives the first portion of the information word, the first eight bits, and determines if the number of bit differences of the corresponding first portions of any of the addresses is less than three. If so, the address detector receives the remaining portion of the information word, the last 24 bits, and combines the first, and last portions to detect the address. However, if every address has three or more bit differences in the first portion, power is conserved for the last portion of the information word.

Figures 5, 5A:
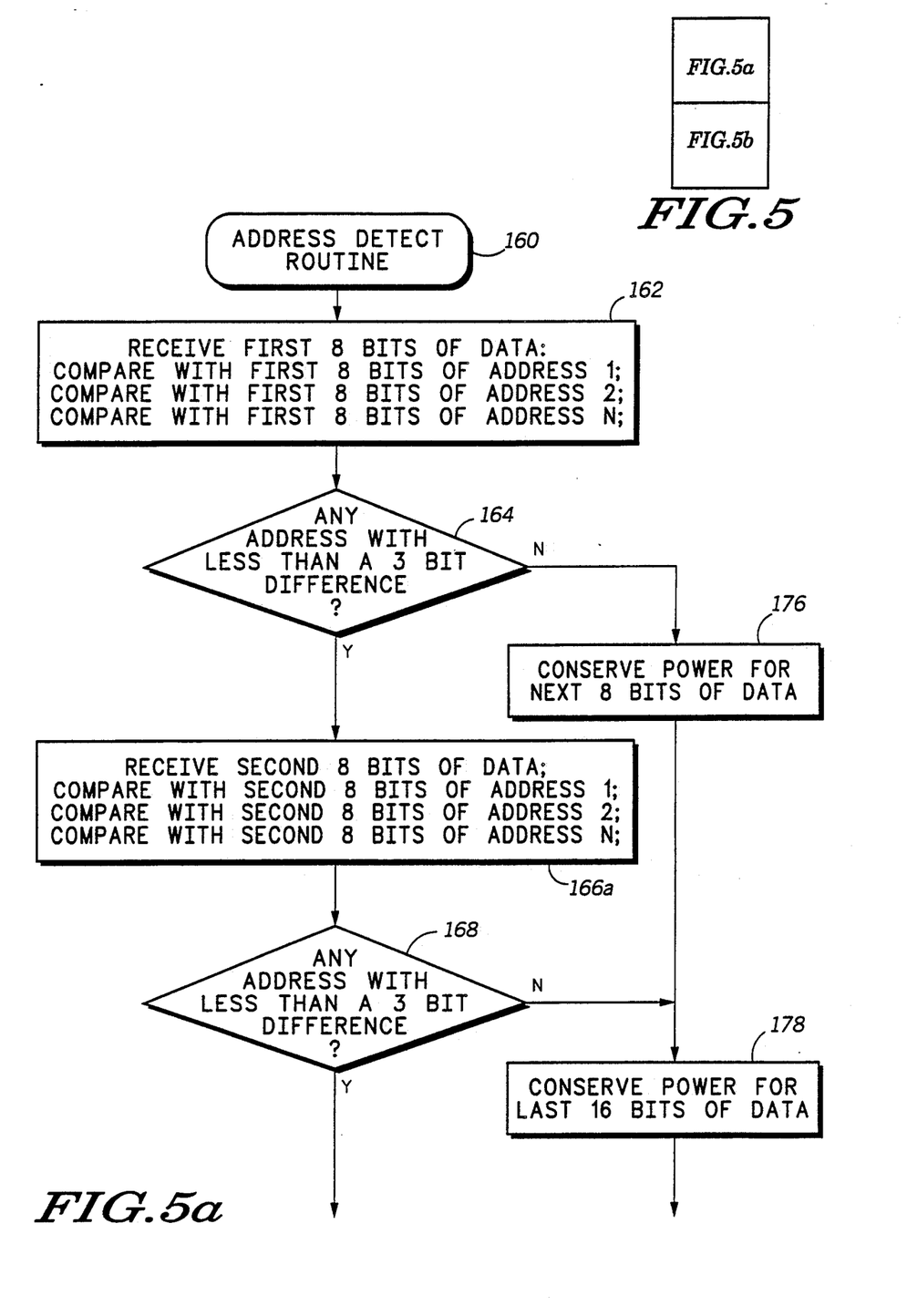
FIGS. 5, 5A and 5B show a flow chart of a second embodiment of the address detect routine of the present invention.
Figure 5B:
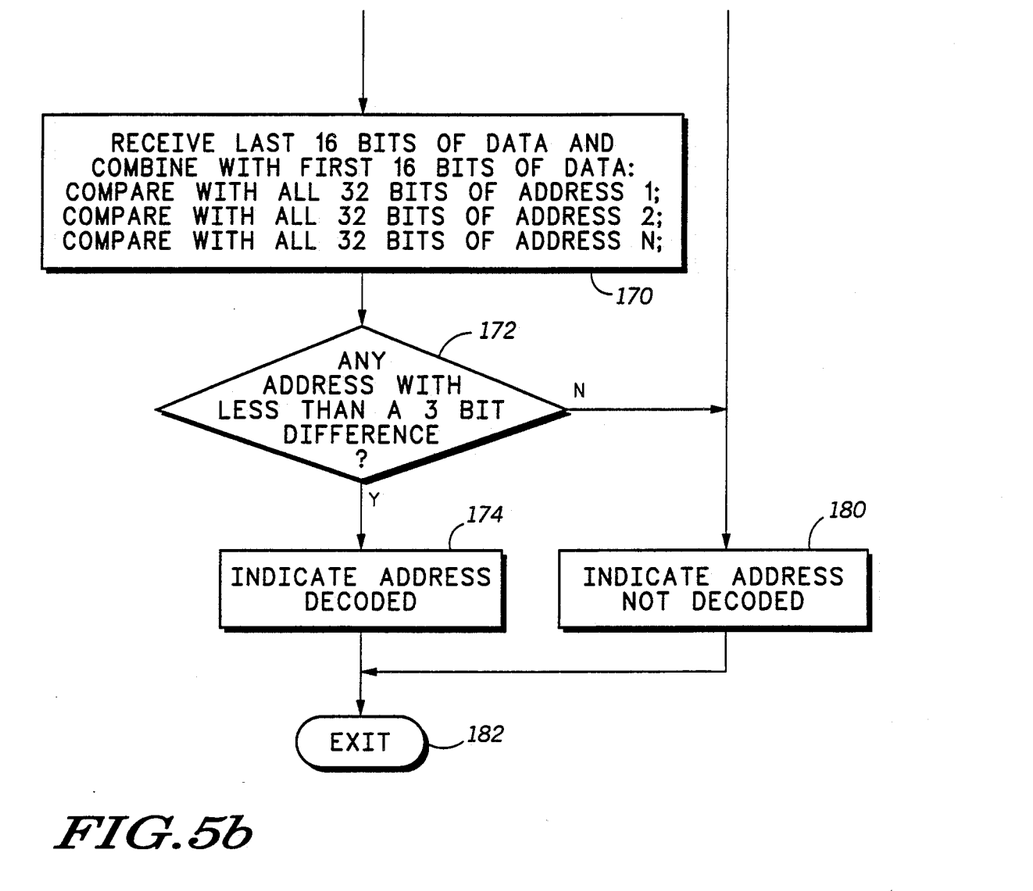

FIG. 5 shows a second embodiment of the invention. As in steps 120, 122 and 124 of FIG. 4, the routine enters at step 160, where eight bits, the first portion of the information word, are received and compared with the first portion of addresses within the code plug in step 162 and less than three bits difference with each address is checked in step 164. Steps 162 and 164 effectively form a first detecting means. If any address has less than three bits difference, the program proceeds to step 166a to receive an additional 8 bits, which corresponds to a second portion of the information word. The second portion of the information word is compared with the second portion of each address. Then in step 168, the second portion of each address is checked to be less than three bits difference between the second portion of the information word. Steps 166 and 168 effectively form a second detecting means. If less than three bits are different from at least one address, the program proceeds to step 170 to receive the last sixteen bits, the third portion, of the information word and combine the first, second and third portions to form a 32 bit information word. The information word is compared against each of the 32 bit addresses. Then as in steps 128 and 129 of FIG. 4, in steps 172 and 174 of FIG. 5, an address is detected if less than three bits differ between an address and the information word, and the corresponding indication is made.

Referring back to step 164, if no address has less than three bits differing, the program proceeds to step 176 to conserve power for the second portion of the information word, the next 8 bits. The program then proceeds to step 178 to conserve power for the third portion of the information word, the next 16 bits. Step 178 is also reached from step 168 when none of the second portions of any address have less than three bits differing from the information word. The means for power conservation in steps 176 and 178 correspond to the means for power conservation of step 130 of FIG. 4. The program then proceeds to step 180 which corresponds to step 132 of FIG. 4 to indicate that no address was detected. From either step 174 or 180, the routine returns to the calling program of FIG. 3 through the exit, 182.

FIG. 5 shows a receiver synchronized to a transmitted signal and performing an address detect routine in order to receive and detect predetermined addresses with an information word. The address detector synchronously receives the first portion of the information word, the first eight bits, and determines if the number of bit errors of the corresponding first portions of any of the addresses is less than three. If so, the address detector receives the second portion, of the information word, the second eight bits, and determines if the number of bit differences of the corresponding second portions of any of the addresses is less than three. If so, the address detector receives the third portion of the information word, the last 16 bits, and combines the first, second and third portions to detect the address. If however, no address has less than three bits differing after the first portion, power is conserved for the remaining second and third portions. And if, no address has less than three bits differing during the second portion, power is conserved for the remaining third portion.

Figures 6, 6A:
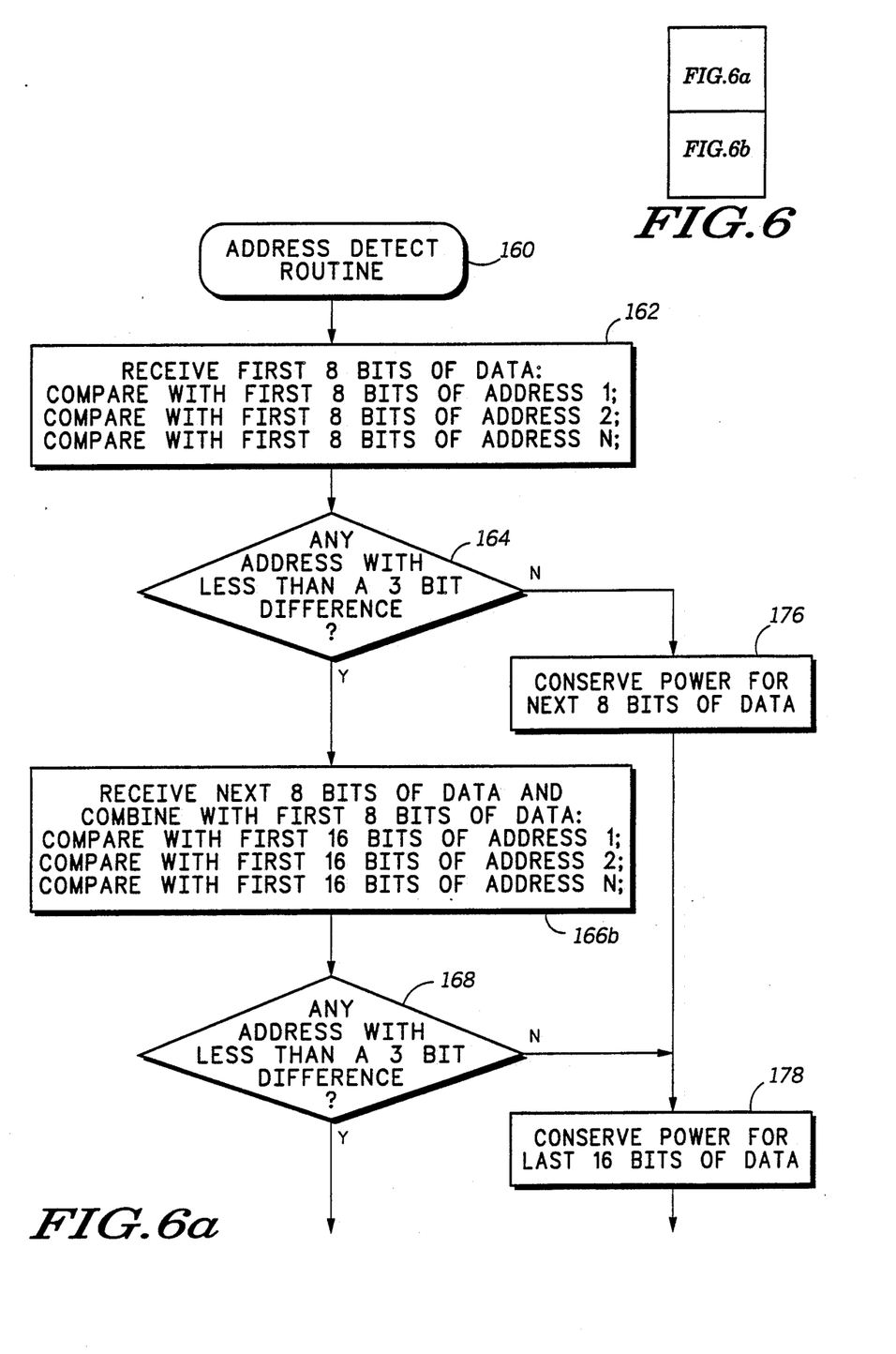
FIGS. 6, 6A and 6B show a flow chart of a third embodiment of the address detect routine of the present invention.
Figure 6B:
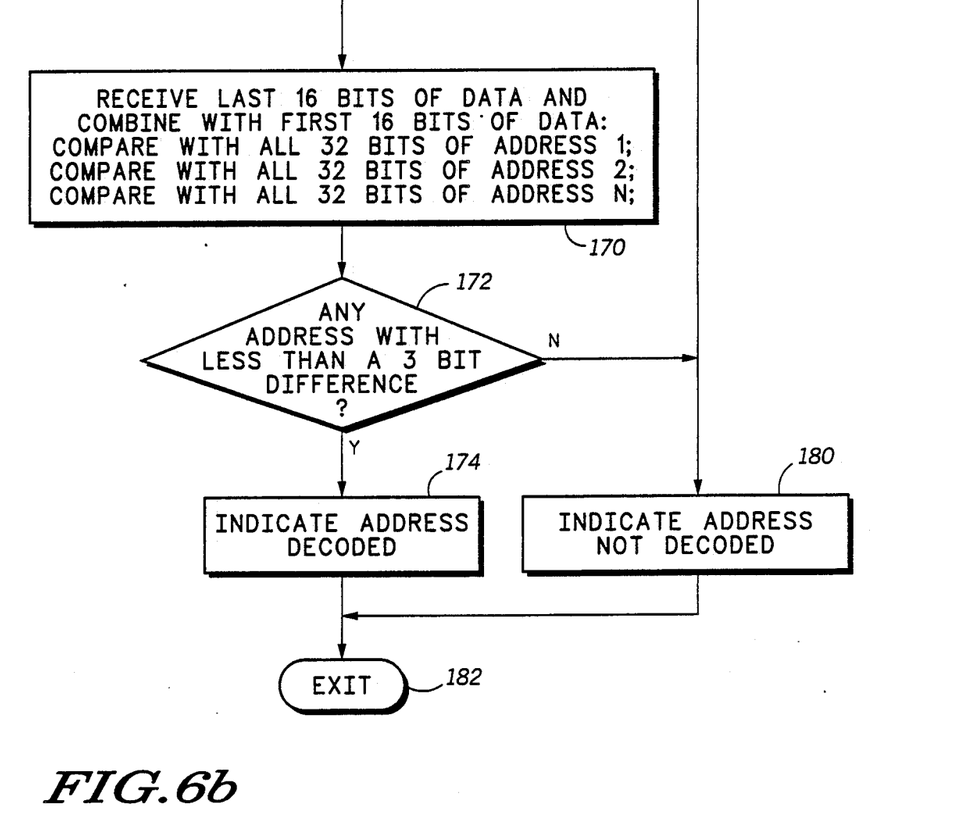

FIG. 6 shows a third embodiment of the present invention. The steps of FIG. 6 are identical to the steps of FIG. 5 with the exception of step 166b in FIG. 6. The embodiment of FIG. 6 upon receiving the second portion combines the second portion with the first portion and then compares the combined first and second portions of the information word with the combined first and second portions of each of the addresses. The corresponding step 166a in FIG. 5 did not combine the first and second portions. The remaining operations are identical to the operations of FIG. 5, and power conservation is achieved during the reception of the information word.

FIG. 6 shows a receiver synchronized to a transmitted signal and performing an address detect routine in order to receive and detect predetermined addresses with an information word. The address detector synchronously receives the first portion of the information word, the first eight bits, and determines if the number of bit errors of the corresponding first portions of any of the addresses is less than three. If so, the address detector receives the second portion of the information word, the second eight bits, combines the first and second portions and determines if the number of bit differences of the corresponding first and second portions of any of the addresses is less than three. If so, the address detector receives the third portion of the information word, the last 16 bits, and combines the first, second and third portions to detect the address. If however, no address has less than three bits differing after the first portion, power is conserved for the remaining second and third portions. And if, no address has less than three bits differing after the combined first and second portions, power is conserved for the remaining third portion.

Figures 7, 7A:
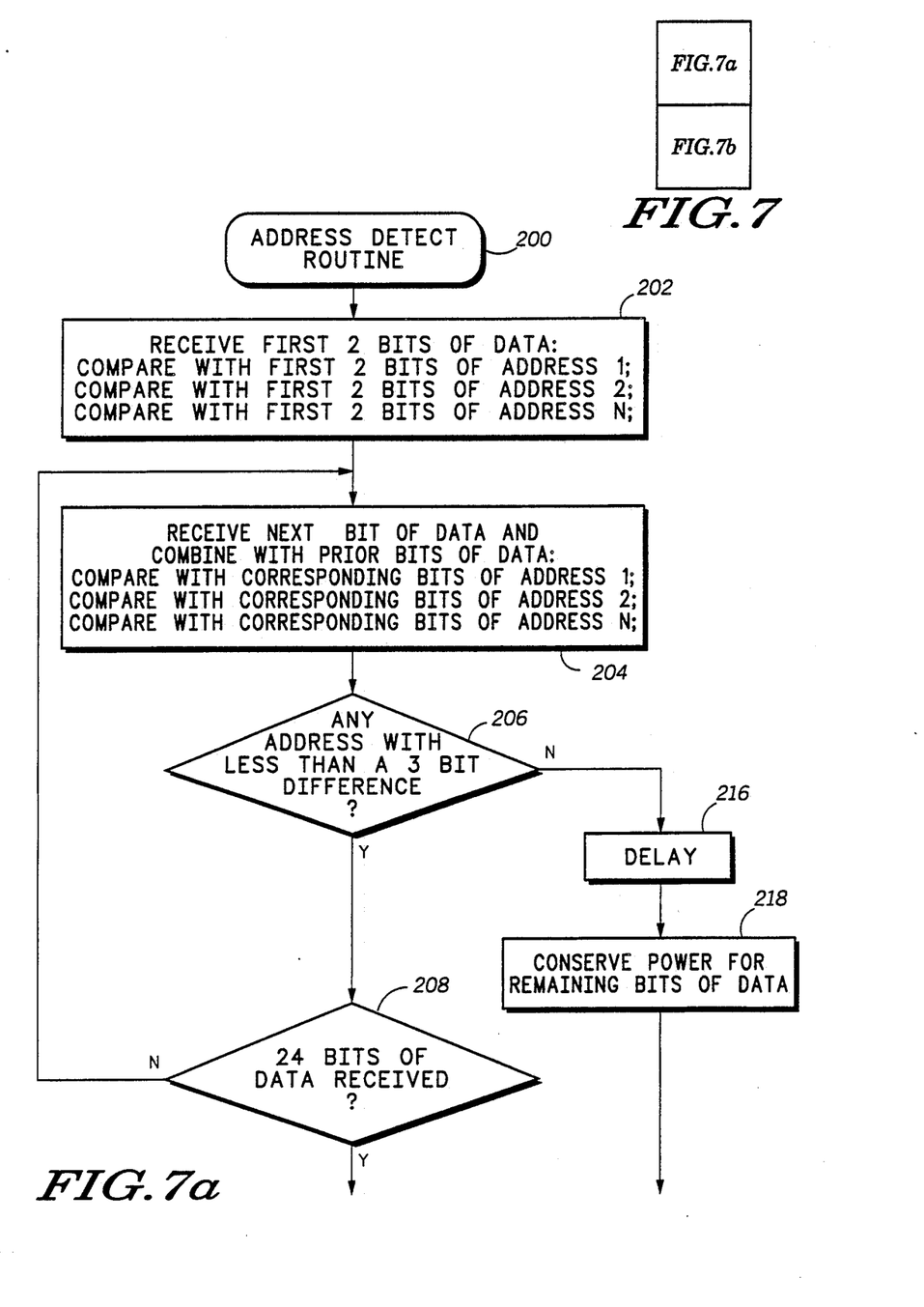
FIGS. 7, 7A and 7B show a flow chart of a fourth embodiment of the, address detect routine of the present invention.
Figure 7B:
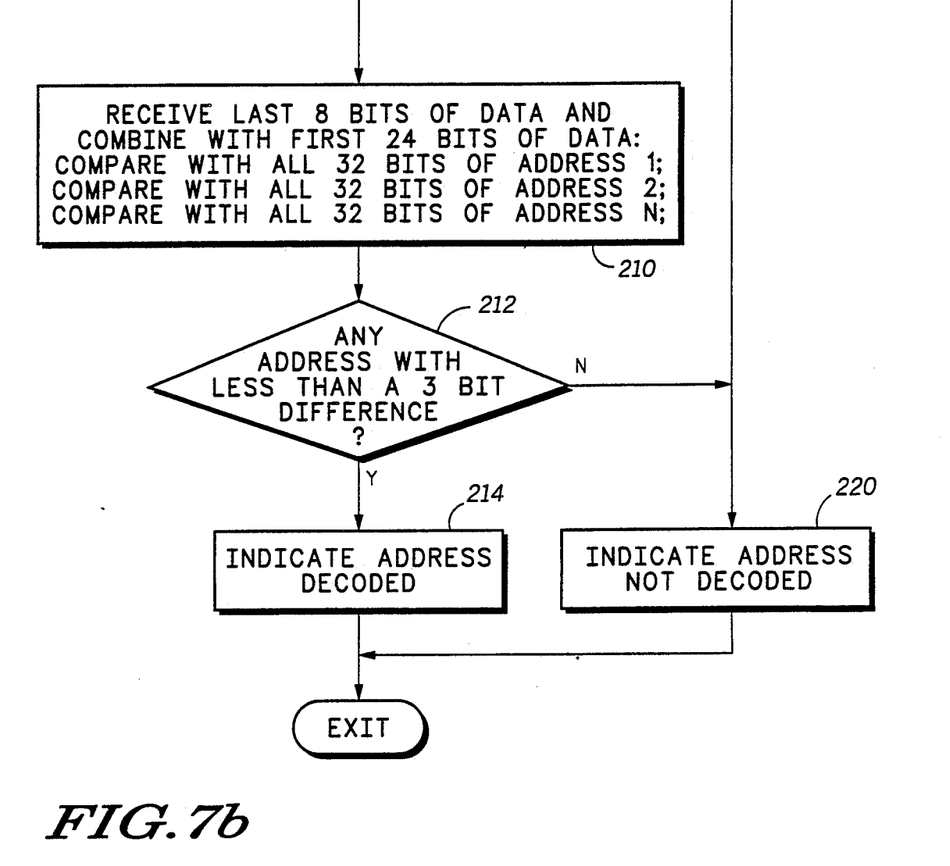

FIG. 7 shows a fourth embodiment of the invention. The routine enters at step 200 which is equivalent to either step 108 or 109 of FIG. 3. The pager synchronized to the signal by the sync code receives the first 2 bits of the information word in step 202. The program proceeds to step 204 to receive the next bit of the information word and combine it with the prior 2 bits received in step 202. Steps 202 and 204 establish a first portion of the information word having a minimum number of three bits. In step 204, the first portion of the information word is compared with the corresponding first portion of each address. The program proceeds to step 206 to determine if the first portion of any address has less than three bits differing with the first portion of the information word. If so, the program proceeds to step 208 to check if 24 bits of the information word have been received. If not, the program returns to step 204 to receive the next bit of the information word and combine it with the prior received bits and compare the newly combined portion of the information word with the corresponding portion of each address. Then step 206 is repeated. Steps 204, 206 and 208 are repeated on a bit by bit basis until either 24 bits of data are received, or no address has a difference of less than three bits. These steps limit to 24 the number of bits for which the bit by bit comparison is made. If after 24 bits, any address has less than three bits differing, the program proceeds to step 210 to receive the last 8 bits of the information word and combine the last 8 bits with the first 24 bits to form a complete 32 bit information word. The 32 bit information word is then compared with each of the addresses. The program proceeds to step 212 to check if any address has less than a three bits differing, if so step 214 indicates a detected address as in step 129 of FIG. 4.

Referring back to step 206, if at any time during the bit by bit comparison, no address has less than three bits differing, the program proceeds to step 216 to delay. The delay may be a one bit delay used by the microprocessor to initiate power conservation procedures, adjust internal timers, or other house keeping functions. The delay of step 216 may also be eliminated. The program then proceeds to step 218 to conserve power for the remaining bits of the information word. The program then proceeds to step 220 to indicate that no address was found, as in step 132 of FIG. 4. This step is also entered from the negative result of step 212. From either step 214 or 220, the routine returns to the calling program of FIG. 3 through the exit, 222.

The minimum number of bits received, as determined by steps 202 and 204, are the preferred minimum. The minimum numbers may be varied to a value greater than or equal to one while still remaining within the scope of the invention. Similarly, the maximum number of bits determined by step 208 is the preferred maximum and may be varied to a value less than the number of bits in the information word while still remaining within the scope of the invention.

FIG. 7 shows a receiver synchronized to a paging signal and performing an address detect routine in order to receive and detect predetermined addresses with an information word. The address detector synchronously receives a first portion of the information word, the first portion having a minimum of three bits, and determines if the number of bit differences with the corresponding first portions of each address is less than three. If any address has a difference less than three, the address detector may be viewed as extending the first portion bit by bit until either the first portion reaches a maximum number of bits, or no address has less than three bits differing. If the maximum number of bits is reached, the remaining bits of the information word are received and combined with the prior received bits for address detection. If no address has less than three bits differing, after a delay, power is conserved for the remainder of the information word.

Figure 8:
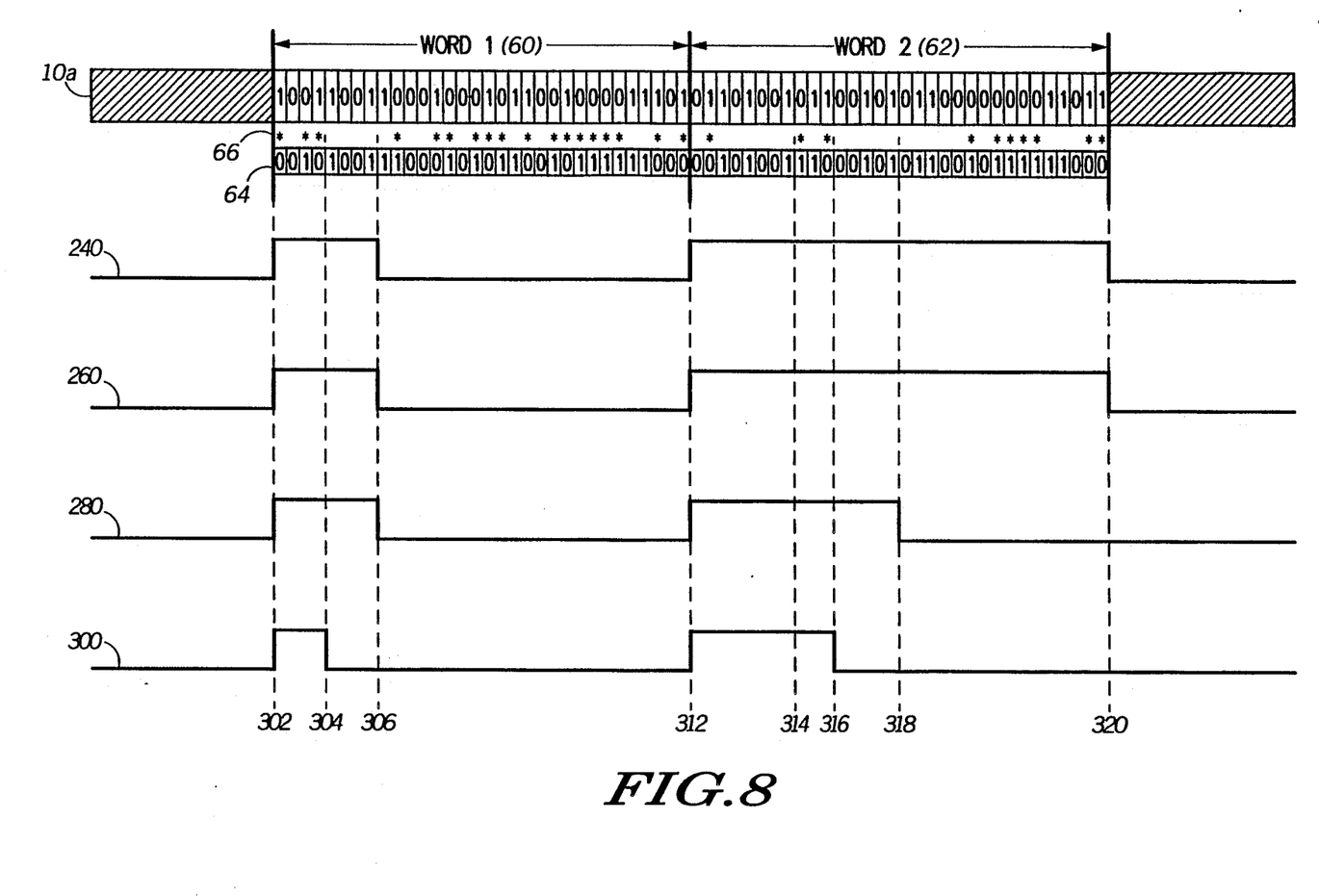
FIG. 8 shows POCSAG information frame and power conservation strobes for the first, second, third and fourth preferred embodiments of the present invention.

FIG. 8 shows the power strobe operation of the four embodiments of the present invention while address detecting. Line 10a, WORD 1, 60, and WORD 2, 62, and the receiver address, 64 and the "*" symbols 66 indicating difference between WORD 1 and the address and WORD 2 and the address are identical to those shown in FIG. 1. Line 240 shows the power conservation strobe of the first embodiment of the invention while receiving signal 10a. Line 260 shows the power conservation strobe of the second embodiment of the invention while receiving signal 10a. Line 280 shows the power conservation strobe of the third embodiment of the invention while receiving signal 10a. Line 300 shows the power conservation strobe of the fourth embodiment of the invention while receiving signal 10a.

The address is active at the beginning of WORD 1 in all of the embodiments as indicated by the positive transitions on lines 240-300 at event 302. More than two differences between the address and WORD 1 occur after the fourth bit of WORD 1, as indicated by event 304. The first, second and third embodiments all receive 8 bits, event 306, prior to testing for differences. After receiving eight bits, the first, second and third embodiments conserve power as indicated by the negative transitions on lines 240, 260 and 280 at event 306. The fourth embodiment however begins power conservation after the three bits of difference are received as indicated by the negative transition at interval 304 on line 300. Here the delay of step 216 of the fourth embodiment is not shown.

All embodiments end power conservation in time to receive the first bit of WORD 2 as indicated by the positive transitions on lines 240-300 at event 312. It is known in the art that actual power conservation may end somewhat prior to the beginning of either WORD 1 or WORD 2 in order to provide for the stabilization of circuitry within the receiver. After the first eight bits are received, only one bit difference exists between the address and the information word as indicated by the single "*" on line 66 between events 312 and 314. Consequently none of the embodiments begin power conservation after the eight bits. Furthermore, the first embodiment which tests only the first eight bits will not conserve power within WORD 2 at any point after the first eight bits. After receiving the eleventh bit, more than two bits are different between WORD 2 and the address as indicated by event 316. In response to more than two bits being different, the fourth embodiment begins power conservation as indicated by the negative transition on line 300 at event 316. At event 318, the second eight bits of WORD 2 are received. The third embodiment determines that one bit difference exists within the first eight bits and two bits of difference exist between the second eight bits. More than two bits of difference exist after sixteen bits are received, in response to which, the third embodiment begins power conservation as indicated by the negative transition on line 280 at event 318. The second embodiment does not begin power conservation at event 318 because only two bits of difference occurred during the second eight bits, which is less than the required three bits of difference. If one additional bit difference would have occurred in the second eight bits, the second embodiment would have also began power conservation at event 318. The first and second embodiments begin power conservation at the end of WORD 2, event 320, as in prior art receivers.

Obviously numerous additional modifications and variations of the present invention are possible in light of the above teachings. Some of the modifications include modification of the first portions and second portions which are shown to be defined as eight bits, any number of bits may be used while remaining within the scope of the invention, so long as the size of the portion is smaller than the information word. Less than a three bit difference is shown to continue address detecting in all of the embodiments. The three bit value may be varied from a value of one to a value provided for by the parity associated with the structure of the information word while still remaining within the scope of the invention. Word structures other then the 32, 21 structure may also be used. The invention is shown to operate on the POCSAG signalling system, the invention may also be applied to other signalling systems which synchronously detect portions of addresses. A binary FSK modulation scheme is shown where a symbol corresponds to one binary bit, other modulations schemes providing single or multiple bits in a symbol may also be used while remaining within the scope of the invention. It is therefore understood that within the scope for the appended claims, the invention may be practiced otherwise than as specifically described herein.

I claim:

1. A reduced power receiver for receiving a transmitted signal comprising a synchronization signal and a plurality of information signals, each information signal having a plurality of portions comprising at least one binary bit signal, the receiver comprising:

synchronization means responsive to the transmitted signal for detecting the synchronization signal and for generating a timing signal indicative of the occurrence of one of said plurality of information signals;

decoding means for decoding a first portion of said plurality of portions of said one of said plurality of information signals and generating a first digital word comprising at least one bit therefrom;

memory means for storing at least one predetermined digital word, each of said at least one predetermined digital word having a plurality of portions comprising at least one bit;

comparison means responsive to the timing signal for comparing said first digital word to corresponding first portions of each of said at least one predetermined digital word and for generating a first undetect signal if said first digital word comprises more than N bits differing from corresponding bits of said first portions of each of said at least one predetermined digital word, where N is an integer greater than zero; and power conservation means responsive to the first undetect signal for reducing the power consumption of the receiver for subsequent portions of said one of said plurality of information signals.

2. The receiver of claim 1 wherein said decoding means decodes the first portion of said one of said plurality of information signals, said first portion comprising the first eight bits of said one of said plurality of information signals, and N equals two.

3. The receiver of claim 1 wherein said first digital word and said first portions of said at least one predetermined digital word comprise a minimum number of bits; and wherein said decoding means decodes a next subsequent portion of said plurality of portions of said one of said information signals if no first undetect signal is generated by said comparison means and generates a second digital word comprising said first digital word and each of said decoded next subsequent portions of said one of said information signals; and wherein said comparison means compares said second digital word to corresponding second portions of said at least one predetermined digital word, said second corresponding portions comprising said first portions of each of said at least one predetermined digital word and having the same number of bits as said second digital word and generates a second undetect signal if said second digital word comprises more than N bits differing from said second corresponding portions.

4. The receiver of claim 3 further comprising signal generation means for generating a detect signal if said second digital word comprises a maximum number of bits and the undetect signal has not been generated by said comparison means, the maximum number of bits being less than the number of bits in said one of said information signals.

5. The receiver of claim 4 wherein each of the plurality of information signals comprises thirty-two bits and the maximum number of bits is twenty-one.

6. The receiver of claim 1 wherein said comparison means comprises:
   first detecting means for generating a detect signal in response to the first digital word having less than N bits different from corresponding bits of each of said first portions of each of said at least one predetermined digital word; and
   second detecting means responsive to the detect signal for decoding a second portion of said plurality of portions of said one of said plurality of information signals, for comparing said decoded second portion to corresponding second portions of said at least one predetermined digital word, and for generating a second undetect signal in response to the decoded second portion comprising more than N bits differing from corresponding bits of each of said corresponding second portions of the at least one predetermined digital word; and wherein
   said power conservation means reduces the power consumption of the receiver for subsequent portions of said one of said plurality of information signals in response to the second undetect signal.

7. The receiver of claim 1 wherein said comparison means comprises:
   first detecting means for generating a detect signal in response to the first digital word having less than N bits different from corresponding bits of each of said first portions of each of said at least one predetermined digital word; and
   second detecting means responsive to the detect signal for decoding a second portion combined with the first portion of said plurality of portions of said one of said plurality of information signals, for comparing said decoded second portion combined with said first portion to corresponding second portions combined with said first portions of said at least one predetermined digital word, and for generating a second undetect signal in response to the decoded second portion combined with the first portion of the one of said plurality of information signals comprising more than N bits differing from corresponding bits of each of said corresponding second portions combined with the first portions of the at least one predetermined digital word; and wherein
   said power conservation means reduces the power consumption of the receiver for subsequent portions of said one of said plurality of information signals in response to the second undetect signal.

8. The receiver of claim 1 wherein the receiver is a selective call receiver having an address and the predetermined digital word corresponds to the address of the selective call receiver.

9. The receiver of claim 1 wherein the transmitted signal includes an information protocol having the synchronization signal and the plurality of information signals, the information protocol being modulated onto a radio frequency carrier, the receiver further comprising a demodulating means for receiving and demodulating said information protocol, the demodulating means consuming power while receiving and demodulating the information protocol, and wherein said power conservation means disables said demodulating means during said subsequent portions of said one of said plurality of information signals.

10. The receiver of claim 1 wherein the decoding means consumes power while decoding the information signals and said power conservation means disables the decoding means in response to the undetect signal.

11. The receiver of claim 1 wherein said synchronizing means, said decoding means and said comparison means are implemented by a microcomputer.

12. A method for reducing the power consumption of a receiver which consumes power while receiving a transmitted signal having a synchronization signal for providing a timing reference for the reception of a plurality of information signals, each information signal dividable into a plurality of portions having at least one bit, the method comprising the steps of:
   synchronizing to the synchronization signal;
   decoding a first portion of the information signal in response to the synchronization signal to generate a first digital word comprising at least one bit;
   comparing the first digital word to first portions of at least one predetermined word, said first portions of said at least one predetermined word having the same number of bits as said first digital word; and
   conserving power for subsequent portions of the information signal if the first digital word comprises more than N bits different from the first portions of said at least one predetermined word, where N is an integer greater than zero.

13. The method of claim 12 wherein the number of bits of said first portion is predetermined.

14. The method of claim 12 wherein the information signal is dividable into at least first, second and subsequent portions, the method further comprising the steps of:
   decoding the second portion of the information signal to generate a second digital word comprising at least one bit in response to the first digital word comprising less than N bits different from the first portions of the at least one predetermined word; and
   conserving power for the subsequent portions of the information signal if the second digital word comprises more than N bits different from second portions of said at least one predetermined signal.

15. The method of claim 12 wherein the information signal is dividable into at least first and second subsequent portions, the method further comprising the steps of:
   decoding the second portion of the information signal to generate a second digital word comprising at least one bit in response to the first digital word comprising less than N bits different from the first portions of the at least one predetermined word; and conserving power for the subsequent portions of the information signal if the second digital word combined with the first digital word comprises more than N bits different from the second portions combined with the first portions of said at least one predetermined signal.

16. The method of claim 12 further comprising the steps of:

decoding a next subsequent portion of the information signal;

combining the decoded next subsequent portion of the information signal with the first digital word to form a combined digital word;

decoding successive next subsequent portions of the information signal and combining the decoded next subsequent portion of the information signal with the combined digital word until a maximum number of said plurality of portions of said information signal have been decoded unless the combined digital word comprises more than N bits different from the first portions combined with the next subsequent portions of said at least one predetermined signal, the maximum number of portions being less than all of said plurality of portions of the information signal; and generating a detect signal unless the combined digital word comprises more than N bits different from the first potions combined with the next subsequent portions of said at least one predetermined signal.

* * * * *